(12) United States Patent
Tiagaraj et al.

(10) Patent No.: US 12,164,319 B2
(45) Date of Patent: Dec. 10, 2024

(54) DUAL LOOP VOLTAGE REGULATOR

(71) Applicant: Intel Corporation, Santa Clara, CA (US)

(72) Inventors: Sathya Narasimman Tiagaraj, Santa Clara, CA (US); Gerald Pasdast, San Jose, CA (US); Edward Burton, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 740 days.

(21) Appl. No.: 17/128,073

(22) Filed: Dec. 19, 2020

(65) Prior Publication Data

US 2022/0197321 A1 Jun. 23, 2022

(51) Int. Cl.
*G05F 1/575* (2006.01)
*G06F 1/26* (2006.01)

(52) U.S. Cl.
CPC .............. *G05F 1/575* (2013.01); *G06F 1/26* (2013.01)

(58) Field of Classification Search
CPC ................................... G05F 1/575; G06F 1/26
See application file for complete search history.

(56) References Cited

U.S. PATENT DOCUMENTS

| | | | | |
|---|---|---|---|---|
| 9,588,541 B1* | 3/2017 | Ho | ............................ | G05F 1/573 |
| 9,946,283 B1* | 4/2018 | Yung | ........................ | G05F 1/575 |
| 10,234,883 B1* | 3/2019 | Du | ............................ | G05F 1/563 |
| 10,591,938 B1* | 3/2020 | Golara | ..................... | G05F 1/575 |
| 10,860,043 B2* | 12/2020 | Hung | ........................ | G05F 1/565 |
| 2011/0316506 A1* | 12/2011 | Bulzacchelli | ........... | G05F 1/575 |
| | | | | 323/282 |
| 2012/0313597 A1 | 12/2012 | Hunter et al. | | |
| 2014/0277812 A1* | 9/2014 | Shih | .......................... | G05F 1/46 |
| | | | | 700/297 |

(Continued)

FOREIGN PATENT DOCUMENTS

| CN | 101763131 A | 6/2010 |
|---|---|---|
| CN | 109375693 A | 2/2019 |

OTHER PUBLICATIONS

International Search Report and Written Opinion, PCT App. No. PCT/US2021/051122, Jan. 7, 2022, 10 pages.

(Continued)

*Primary Examiner* — Vincent H Tran
(74) *Attorney, Agent, or Firm* — NICHOLSON DE VOS WEBSTER & ELLIOTT LLP

(57) ABSTRACT

A dual-loop low-drop (LDO) regulator having a first loop which is an analog loop that compares the voltage on the output supply node with a reference, and generates a bias or voltage control to control a strength of a final power switch. The first loop regulates the output voltage relative to a reference voltage by minimizing the error between the two voltages. A second loop (digital loop) that controls a current source which injects current on the gate of the final power switch to boost current for a load. The second loop is an auxiliary loop that boosts the current load for a set interval until the tracking bandwidth of the LDO resolves the error in the output, thereby reducing the peak-to-peak noise. The quiescent current is not increased a lot by the second loop since the second loop circuit is on for a fraction of the entire LDO operation.

20 Claims, 7 Drawing Sheets

(56) References Cited

U.S. PATENT DOCUMENTS

| | | | |
|---|---|---|---|
| 2016/0173066 A1* | 6/2016 | Yang | H03K 19/01714 |
| | | | 327/109 |
| 2016/0306374 A1* | 10/2016 | Ghayal | G05F 1/59 |
| 2016/0334818 A1 | 11/2016 | Singh et al. | |
| 2016/0342185 A1* | 11/2016 | Rodriguez | G06F 1/3243 |
| 2017/0041001 A1 | 2/2017 | Raychowdhury et al. | |
| 2017/0199537 A1* | 7/2017 | Duong | G05F 1/575 |
| 2019/0146532 A1* | 5/2019 | Ballarin | G05F 1/462 |
| | | | 323/283 |
| 2019/0258283 A1* | 8/2019 | Pishdad | G05F 1/575 |
| 2019/0265769 A1* | 8/2019 | Gelman | H03K 5/01 |
| 2020/0142436 A1 | 5/2020 | Chang et al. | |
| 2022/0137655 A1* | 5/2022 | Ray | G05F 1/565 |
| | | | 323/282 |

OTHER PUBLICATIONS

European Search Report and Search Opinion, EP App. No. 21907377.2, Oct. 14, 2024, 14 pages.

* cited by examiner

DUAL LOOP VOLTAGE REGULATOR

BACKGROUND

High-speed high-bandwidth (high-BW) input-output (IO) usually demands a clean power supply to run with enough timing margin and to reduce jitter across an IO link. These kinds of high-BW applications are dependent more on input data pattern and the Burst-Idle-Burst (BIB) nature of the data which dictates the power supply noise. Here, BIB refers to characteristics of a data pattern of a load, where the data pattern includes patterns of data toggling followed by no toggling and then toggling again. Estimating data pattern is usually expensive in terms of power, latency, area-utilization and requires high-BW regulators to be less sensitive to data patterns. Hence, low-dropout (LDO) regulators for data-path and IO drivers is less preferred due to its wide current range requirement and high di/dt charging and discharging at an IO pad.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
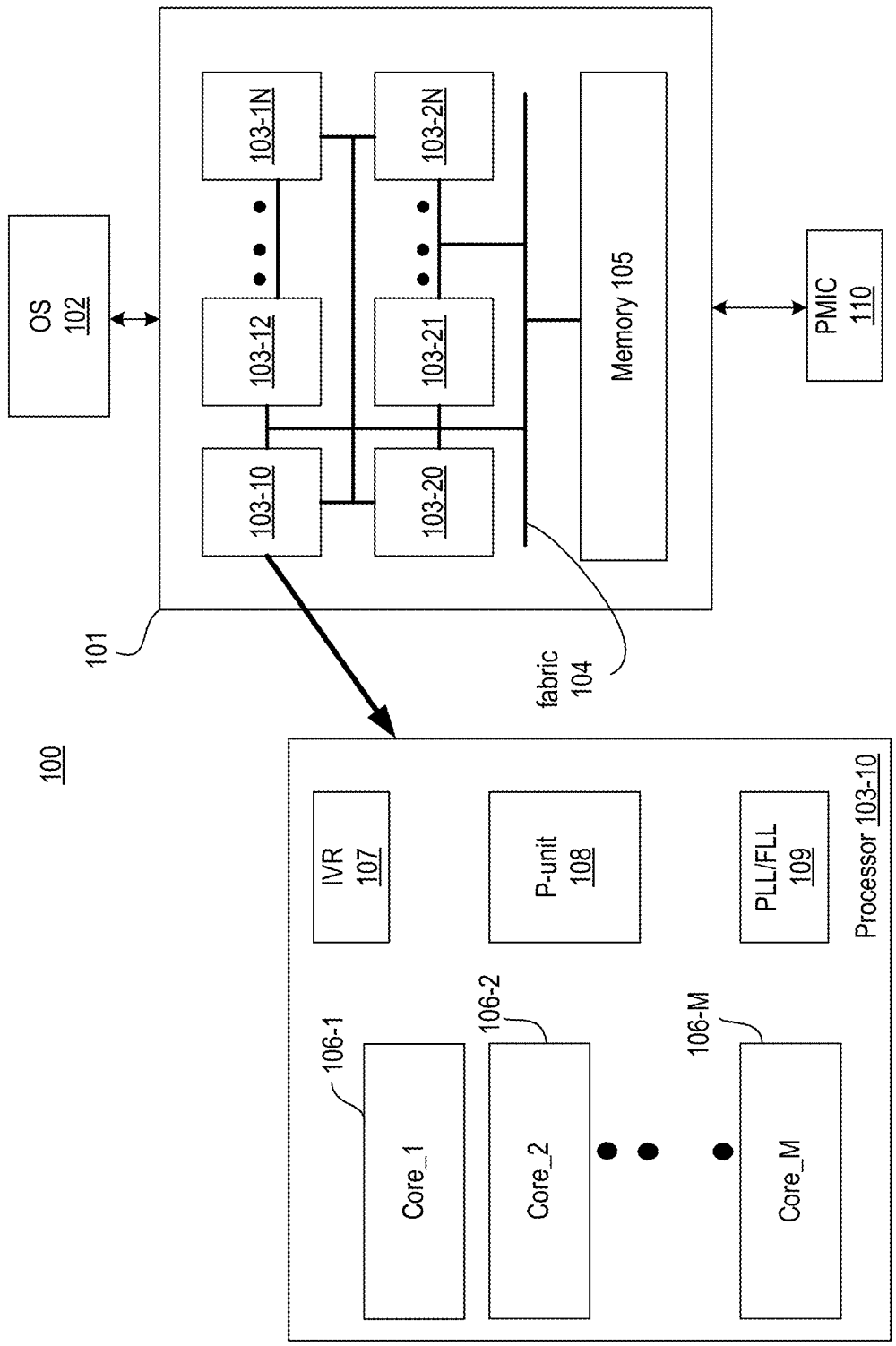
FIG. 1 illustrates a processor system with an integrated dual loop voltage regulator, in accordance with some embodiments.

One option to counteract the initial burst-idle-burst noise or data dependent droop on a power supply node is to calculate the number of data transitions every cycle and proactively adjust the final regulator switch for incoming data. Such regulation by an LDO regulator is referred to as feed forward LDO regulator. In feed forward regulation, input data is known a priori. However, when input data is random, the feed forward regulation may become compute intensive. In one example, a feed forward LDO regulator may involve an additional charge pump to boost the power switch or a local capacitor bank to provide the initial charge till LDO current can be ramped up.

Some embodiments describe an LDO regulator that includes a dual loop regulation mechanism. A first loop of the dual loop is an analog loop that compares the voltage on the output supply node with the reference and generates a bias or voltage control to control a strength of the final power switch. The first loop regulates the output voltage relative to a reference voltage by minimizing the error between the two voltages. A second loop of the dual loop is a digital loop that controls a current source which injects current on the gate of the final power switch to boost current for a load. The second loop is an auxiliary loop. In some embodiments, the auxiliary loop boosts the current load for a set interval until the tracking BW of the LDO resolves the error in the output, thereby reducing the peak-to-peak noise. In some embodiments, the quiescent current is not increased a lot by the second loop since the second loop circuit is on for a fraction of the entire LDO operation. In some embodiments, to combat data pattern dependency, a voltage comparator is used to control the current injector to prevent the output voltage going in the opposite direction.

There are many technical effects of various embodiments. For example, the dual LDO scheme enables a processor to reduce the power supply noise without introducing analog complications like charge pumps, high frequency amplifiers or passives thereby reducing the area of the circuit. The dual LDO scheme can be implemented for p-type and/or n-type driving transistors. In some embodiments, the efficiency of the dual loop regulator is almost the same or is degraded only by a marginal amount (e.g., less than 1-2%). The deterministic jitter of the circuits under the dual loop LDO supply is reduced by the same proportion as power supply noise (PSN) reduction. Lower PSN pushes the IO link for higher data rate (e.g., area savings and higher $BW/mm^2$) or supply reduction to achieve same jitter characteristics (power savings and lower pJ/bit). Other technical effects will be evident from the various figures and embodiments.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

FIG. 1 illustrates processor system 100 with an integrated dual loop voltage regulator, in accordance with some embodiments. Processor system 100 comprises processor 101 coupled to operating system (OS) 102. Processor 101 comprises one or more processors 103 (individually labeled as processors 103_10 through 103_1N, and 103_20 through 103_2N, where 'N' is a number), fabric 104 connecting the processor 103, and memory 105. In some embodiments, each processor 103 is a die, dielet, or chiplet. Here the term "die" generally refers to a single continuous piece of semiconductor material (e.g. silicon) where transistors or other components making up a processor core may reside. Multi-core processors may have two or more processors on a single die, but alternatively, the two or more processors may be provided on two or more respective dies. Each die has a dedicated power controller or power control unit (p-unit) power controller or power control unit (p-unit) which can be dynamically or statically configured as a supervisor or supervisee. In some examples, dies are of the same size and functionality i.e., symmetric cores. However, dies can also be asymmetric. For example, some dies have different size and/or function than other dies. Each processor 103 may also be a dielet or chiplet. Here the term "dielet" or "chiplet" generally refers to a physically distinct semiconductor die, typically connected to an adjacent die in a way that allows the fabric across a die boundary to function like a single fabric rather than as two distinct fabrics. Thus at least some dies may be dielets. Each dielet may include one or more p-units which can be dynamically or statically configured as a supervisor, supervisee or both.

In some embodiments, fabric 104 is a collection of interconnects or a single interconnect that allows the various dies to communicate with one another. Here the term "fabric" generally refers to communication mechanism having a known set of sources, destinations, routing rules, topology and other properties. The sources and destinations may be any type of data handling functional unit such as power management units. Fabrics can be two-dimensional spanning along an x-y plane of a die and/or three-dimensional (3D) spanning along an x-y-z plane of a stack of vertical and horizontally positioned dies. A single fabric may span multiple dies. A fabric can take any topology such as mesh topology, star topology, daisy chain topology. A fabric may be part of a network-on-chip (NoC) with multiple agents. These agents can be any functional unit.

In some embodiments, each processor 103 may include a number of processor cores. One such example is illustrated with reference to processor 103_10. In this example, processor 103_10 includes a plurality of processor cores 106-1 through 106-M, where M is a number. For the sake of simplicity, a processor core is referred by the general label 106. Here, the term "processor core" generally refers to an independent execution unit that can run one program thread at a time in parallel with other cores. A processor core may include a dedicated power controller or power control unit (p-unit) which can be dynamically or statically configured as a supervisor or supervisee. This dedicated p-unit is also referred to as an autonomous p-unit, in some examples. In some examples, all processor cores are of the same size and functionality i.e., symmetric cores. However, processor cores can also be asymmetric.

For example, some processor cores have different size and/or function than other processor cores. A processor core can be a virtual processor core or a physical processor core. Processor 103_10 may include an integrated voltage regulator (IVR) 107, power control unit (p-unit) 108, phase locked loop (PLL) and/or frequency locked loop (FLL) 109. The various blocks of processor 103_10 may be coupled via an interface or fabric. Here, the term "interconnect" refers to a communication link, or channel, between two or more points or nodes. It may comprise one or more separate conduction paths such as wires, vias, waveguides, passive components, and/or active components. It may also comprise a fabric. In some embodiments, p-unit 108 is coupled to OS 102 via an interface. Here the term "interface" generally refers to software and/or hardware used to communicate with an interconnect. An interface may include logic and I/O driver/receiver to send and receive data over the interconnect or one or more wires.

In some embodiments, each processor 103 is coupled to a power supply via voltage regulator. The voltage regulator may be internal to processor system 101 (e.g., on the package of processor system 101) or external to processor system 101. In some embodiments, each processor 103 includes IVR 107 that receives a primary regulated voltage from the voltage regulator of processor system 101 and generates an operating voltage for the agents of processor 103. The agents of processor 103 are the various components of processor 103 including cores 106, IVR 107, p-unit 108, PLL/FLL 109.

Accordingly, an implementation of IVR 107 may allow for fine-grained control of voltage and thus power and performance of each individual core 106. As such, each core 106 can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. For example, each core 106 may include an IVR to manage power supply to that core where that IVR receives input power supply from the regulated output of IVR 107 or voltage regulator of processor system 101. During power management, a given power domain of one IVR may be powered down or off when the processor core 106 is placed into a certain low power state, while another power domain of another IVR remains active, or fully powered. As such, an IVR may control a certain domain of a logic or processor core 106. Here the term "domain" generally refers to a logical or physical perimeter that has similar properties (e.g., supply voltage, operating frequency, type of circuits or logic, and/or workload type) and/or is controlled by a particular agent. For example, a domain may be a group of logic units or function units that are controlled by a particular supervisor. A domain may also be referred to an Autonomous Perimeter (AP). A domain can be an entire system-on-chip (SoC) or part of the SoC, and is governed by a p-unit.

In some embodiments, each processor 103 includes its own p-unit 108. P-unit 108 controls the power and/or performance of processor 103. P-unit 108 may control power and/or performance (e.g., IPC, frequency) of each individual core 106. In various embodiments, p-unit 108 of each processor 103 is coupled via fabric 104. As such, the p-units 108 of each processor 103 communicate with another and OS 102 to determine the optimal power state of processor system 101 by controlling power states of individual cores 106 under their domain.

P-unit 108 may include circuitry including hardware, software and/or firmware to perform power management operations with regard to processor 103. In some embodiments, p-unit 108 provides control information to voltage regulator of processor system 101 via an interface to cause the voltage regulator to generate the appropriate regulated voltage. In some embodiments, p-unit 108 provides control information to IVRs of cores 106 via another interface to control the operating voltage generated (or to cause a corresponding IVR to be disabled in a low power mode). In some embodiments, p-unit 108 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software). In some embodiments, p-unit 108 is implemented as a microcontroller.

The microcontroller can be an embedded microcontroller which is a dedicated controller or as a general-purpose controller. In some embodiments, p-unit 108 is implemented as a control logic configured to execute its own dedicated power management code, here referred to as pCode. In some embodiments, power management operations to be performed by p-unit 108 may be implemented externally to a processor 103, such as by way of a separate power management integrated circuit (PMIC) or other component external to processor system 101. In yet other embodiments, power management operations to be performed by p-unit 108 may be implemented within BIOS or other system software. In some embodiments, p-unit 108 of a processor 103 may assume a role of a supervisor or supervisee.

Here the term "supervisor" generally refers to a power controller, or power management, unit (a "p-unit"), which monitors and manages power and performance related parameters for one or more associated power domains, either alone or in cooperation with one or more other p-units. Power/performance related parameters may include but are not limited to domain power, platform power, voltage, voltage domain current, die current, load-line, temperature, device latency, utilization, clock frequency, processing efficiency, current/future workload information, and other parameters. It may determine new power or performance parameters (limits, average operational, etc.) for the one or more domains. These parameters may then be communicated to supervisee p-units, or directly to controlled or monitored entities such as VR or clock throttle control registers, via one or more fabrics and/or interconnects. A supervisor learns of the workload (present and future) of one or more dies, power measurements of the one or more dies, and other parameters (e.g., platform level power boundaries) and determines new power limits for the one or more dies. These power limits are then communicated by supervisor p-units to the supervisee p-units via one or more fabrics and/or interconnect. In examples where a die has one p-unit, a supervisor (Svor) p-unit is also referred to as supervisor die.

Here the term "supervisee" generally refers to a power controller, or power management, unit (a "p-unit"), which monitors and manages power and performance related parameters for one or more associated power domains, either alone or in cooperation with one or more other p-units and receives instructions from a supervisor to set power and/or performance parameters (e.g., supply voltage, operating frequency, maximum current, throttling threshold, etc.) for its associated power domain. In examples where a die has one p-unit, a supervisee (Svee) p-unit may also be referred to as a supervisee die. Note that a p-unit may serve either as a Svor, a Svee, or both a Svor/Svee p-unit In various embodiments, p-unit 108 executes a firmware (referred to as pCode) that communicates with OS 102. In various embodiments, each processor 103 includes a PLL or FLL 109 that generates clock from p-unit 108 and input clock (or reference clock) for each core 106. Cores 106 may include or be associated with independent clock generation circuitry such as one or more PLLs to control operating frequency of each core 106 independently.

In some embodiments, IVR 107 includes a dual loop LDO voltage regulator. The dual loop LDO voltage regulator comprises a first loop and a second loop. The first loop of the dual loop is an analog loop that compares the voltage on the output supply node with a reference, and generates a bias or voltage control to control a strength of a final power switch. The first loop regulates the output voltage relative to a reference voltage by minimizing the error between the two voltages. The second loop of the dual loop is a digital loop that controls a current source which injects current on the gate of the final power switch to boost current for a load. The second loop is an auxiliary loop. In some embodiments, the auxiliary loop boosts the current load for a set interval until the tracking BW of the LDO resolves the error in the output, thereby reducing the peak-to-peak noise. In some embodiments, the quiescent current is not increased a lot by the second loop since the second loop circuit is on for a fraction of the entire LDO operation. In some embodiments, to combat data pattern dependency, a voltage comparator is used to control the current injector to prevent the output voltage going in the opposite direction.

In some embodiments, the second loop turns on the current injector at the beginning of a valid indication if the LDO VR is being used for patterns that are guaranteed to always have transitions (scrambling). The valid indication which is an asserted signal having a pulse width of a duration encompassing incoming data. Conversely, a valid indication which is a de-asserted signal has a pulse width of a duration where there is no data. By turning on the current injector, the first droop on the output supply node is reduced and the LDO is enabled to regulate the output voltage using the first loop. Since the scrambler ensures B-I-B step size is not from 0 to maximum, based on the valid indication, all the current injector legs are turned on once for maximum current injection on the output supply node reducing the logic and detector complexity.

If the data is not scrambled, the first droop could be anywhere in the valid region. In some embodiments, the second loop includes a comparator. The comparator is a high-speed comparator which compares the output of LDO with a configurable reference, and in the event of droop detection below the configurable reference, turns on the current injector till the droop recovers back. The second loop has a faster response than the first loop. For example, the second loop operates between 1 to 2 GHz while the first loop operates around 300 MHz. This auxiliary loop or second loop tracks the high BW beyond 300 MHz till clock frequency and LDO tracks DC to 300 MHz.

In some embodiments, the output of the high-speed comparator is given to an up/down counter enabling some or all of the current injector legs at once, and disabling the current injector legs slowly based on the output of the high-speed comparator. The current from the current injector starts with maximum injection. This current is almost instantaneous since there is no capacitor on this node and is driven off a source follower, in accordance with some embodiments.

In some embodiments, the injector current is altered to a reduced value after one cycle of LDO's closed loop bandwidth (e.g., the bandwidth of the first loop). As such, voltage fluctuations on the output node of the regulator is prevented. The injector is switched off either after fixed number of clock cycles in fully-on case or when the comparator indicates the droop has recovered (whichever is best for noise reduction based on implementation). While the embodiments illustrate the dual loop regulator in IVR 107, the dual loop regulator of various embodiments can be used in other locations. For example, the dual loop regulator can be positioned in any one of cores 106-1 through 106-M, in processor system 101, and/or in power management integrated circuit (PMIC) 110.

Figure 2A:
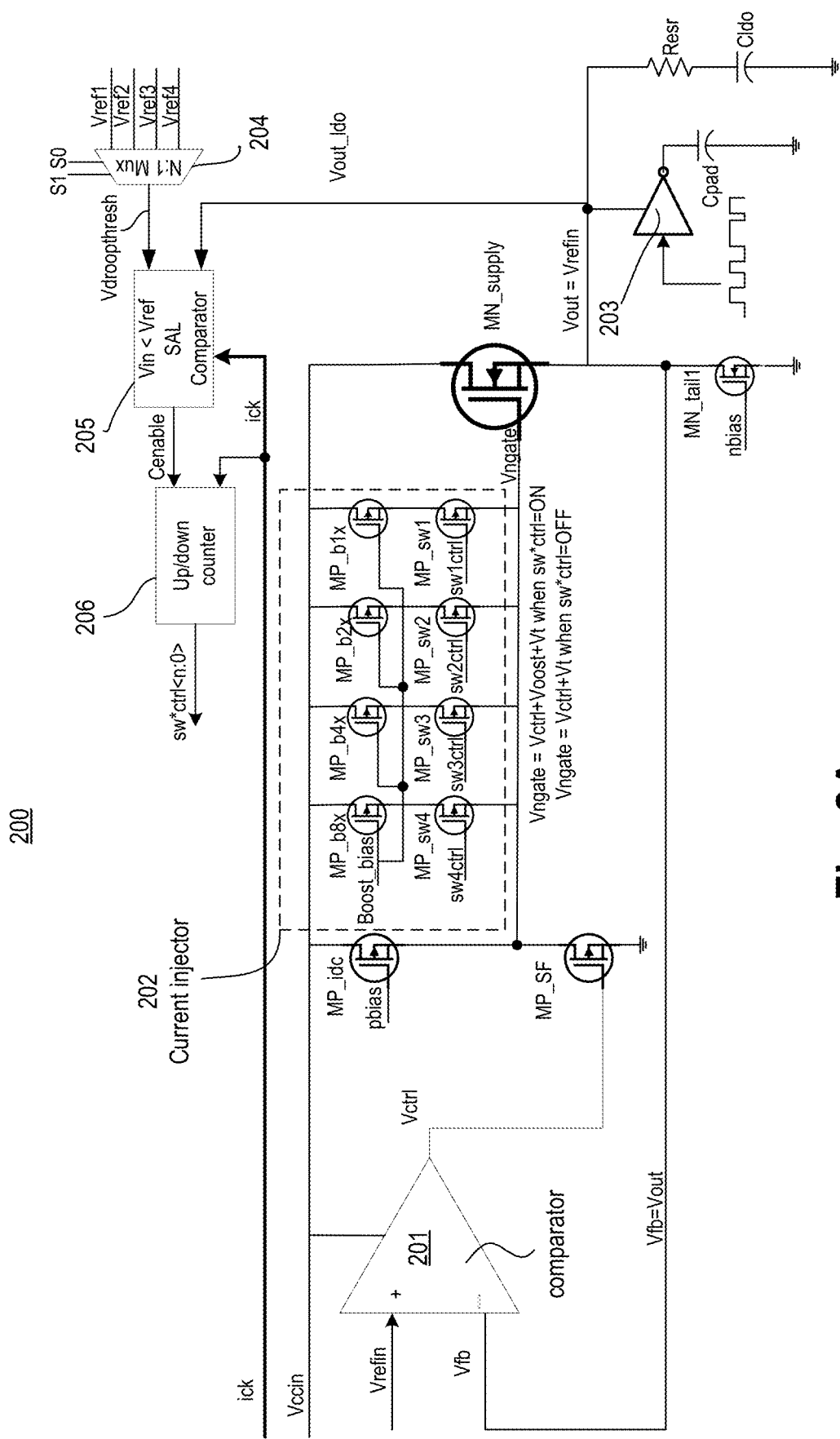
FIG. 2A illustrates the integrated dual loop voltage regulator, in accordance with some embodiments.

FIG. 2A illustrates the integrated dual loop voltage regulator 200, in accordance with some embodiments. Dual loop voltage regulator 200 comprises a first loop and a second loop. The first loop comprises comparator 201, p-type transistors MP_idc MP_SF, n-type driver MN_supply, and n-type tail device MN_tail1. The second loop comprises current injector 202, load 203, N:1 multiplexer (Mux) 204 (which may be part of the loop or outside of the loop), comparator 205, counter 206, n-type driver MN_supply, and n-type tail device MN_tail1. The output supply rail Vout is coupled to a C-load capacitor Cldo and/or series coupled resistance Rser. Here, load 203 is illustrated a driver that drives data to an IO pad having pad capacitance Cpad. Depending on the data pattern at the input and/or output of driver 203, the output supply node Vout may experience B-I-B. However, any suitable load can be used as load 203. For example, load 203 can be a processor core, a logic area of a processor core, an I/O region, etc.

In some embodiments, comparator 201 is a low speed or low bandwidth comparator. For example, comparator 201 bandwidth is around 300 MHz. Comparator 201 compares the voltage on the output supply node Vout (herein also referred to as the feedback voltage vfb) with a reference voltage Vrefin. The output Vctrl of comparator 201 controls p-type transistor MP_SF which in turn sets the bias voltage for Vngate. Vngate controls the turn on voltage of n-type driver transistor MN_supply. In some embodiments, a version of Vout (e.g., a divided down version of Vout) is used as Vfb by comparator 201. The first loop is a low bandwidth loop (e.g., 300 MHz) which regulates the voltage on Vout node during steady state by minimizing the error between Vfb and Vrefin. Here, node names and signal names are interchangeably used. For example, Vout may refer to voltage on node Vout or the output supply rail depending on the context of the sentence.

In some embodiments, p-type transistor MP_idc is a current source which is biased by pbias. Any suitable bias generator can be used to generate pbias. For example, a voltage divider, resistor divider, and/or bandgap circuit may be used to generate pbias. In some embodiments, n-type transistor MP_tail1 is a current source which is biased by nbias. Any suitable bias generator can be used to generate nbias. For example, a voltage divider, resistor divider, and/or bandgap circuit may be used to generate nbias.

In some embodiments, the second loop comprises comparator 205 which compares Vout or a version of Vout (e.g., divided down version of Vout) with a droop threshold Vdroopthresh. In various embodiments, comparator 205 is a high-speed comparator. For example, comparator 205 operates in the 1-2 GHz range. In some embodiments, comparator 205 is a strong-arm latch (SAL) which latches the output result using clock iclk (e.g., 1-2 GHz clock). In some embodiments, droop threshold Vdroopthresh is an adjustable threshold. In some embodiments, droop threshold Vdroopthresh is dynamically updated according to data pattern at load 203 or workload of load 203. In some embodiments, droop threshold Vdroopthresh is generated by multiplexer 204. Multiplexer 204 can select a reference from among a number of reference voltages Vref1 through VrefN using select signals S0 and S1. In various embodiments, S0 and S1 are generated by a logic (e.g., a finite state machine) that monitors data patterns to determine if a droop is approaching and how deep the droop may be. In some embodiments, S0 and S1 are set statically. For example, S0 and S1 are set by fuses or registers. In some embodiments, S0 and S1 set a threshold which is 50% of the highest Vref. For example, droop threshold Vdroopthresh is set in the middle of the N thresholds ranging from highest to the lowest threshold.

The output Cenable of comparator 205 is used to start or stop a counter 206. In some embodiments, counter 206 is an up/down counter which counts up or down depending on a logic value of Cenable. The output of counter 206 is an n-bit code word (e.g., a number of bits) sw*ctrl=[N;0], where * is 1 through M, and where M is the number of switches of current injector 202. In some embodiments, current injector 202 comprises a number of switches coupled in series with current sources. For example, current source MP_sw1x (biased by Boost bias) is in series with switch MP_sw1 controlled by sw1ctrl. Current source MP_sw2x (biased by Boost bias) is in series with switch MP_sw2 controlled by sw1ctr2. Current source MP_sw4x (biased by Boost bias) is in series with switch MP_sw3 controlled by sw1ctr3. Current source MP_sw8x (biased by Boost bias) is in series with switch MP_sw4 controlled by sw1ctr4. In various embodiments, the current sources of current injector 202 are binary weighted as indicated by labels 1x, 2x, 4x, and 8x for the current sources. In some embodiments, the current sources of current injector 202 are thermometer weighted. Boost bias could be the same pbias as discussed herein or it could be generated using any suitable bias generated or derived from a master bias generated that generates pbias for biasing the p-type transistor MP_idc.

While the embodiment of FIG. 2A is illustrated with n-type driver MN_supply and p-type current injector 202, the scheme of various embodiments is applicable to a p-type driver and n-type current injector. In that case, n-type current injector will be coupled between Vngate and ground instead of Vngate and input supply Vccin. The tail current source MN_tail1 is converted to a p-type current source, and the inputs to comparator 201 are flipped or swapped.

Figure 2B:
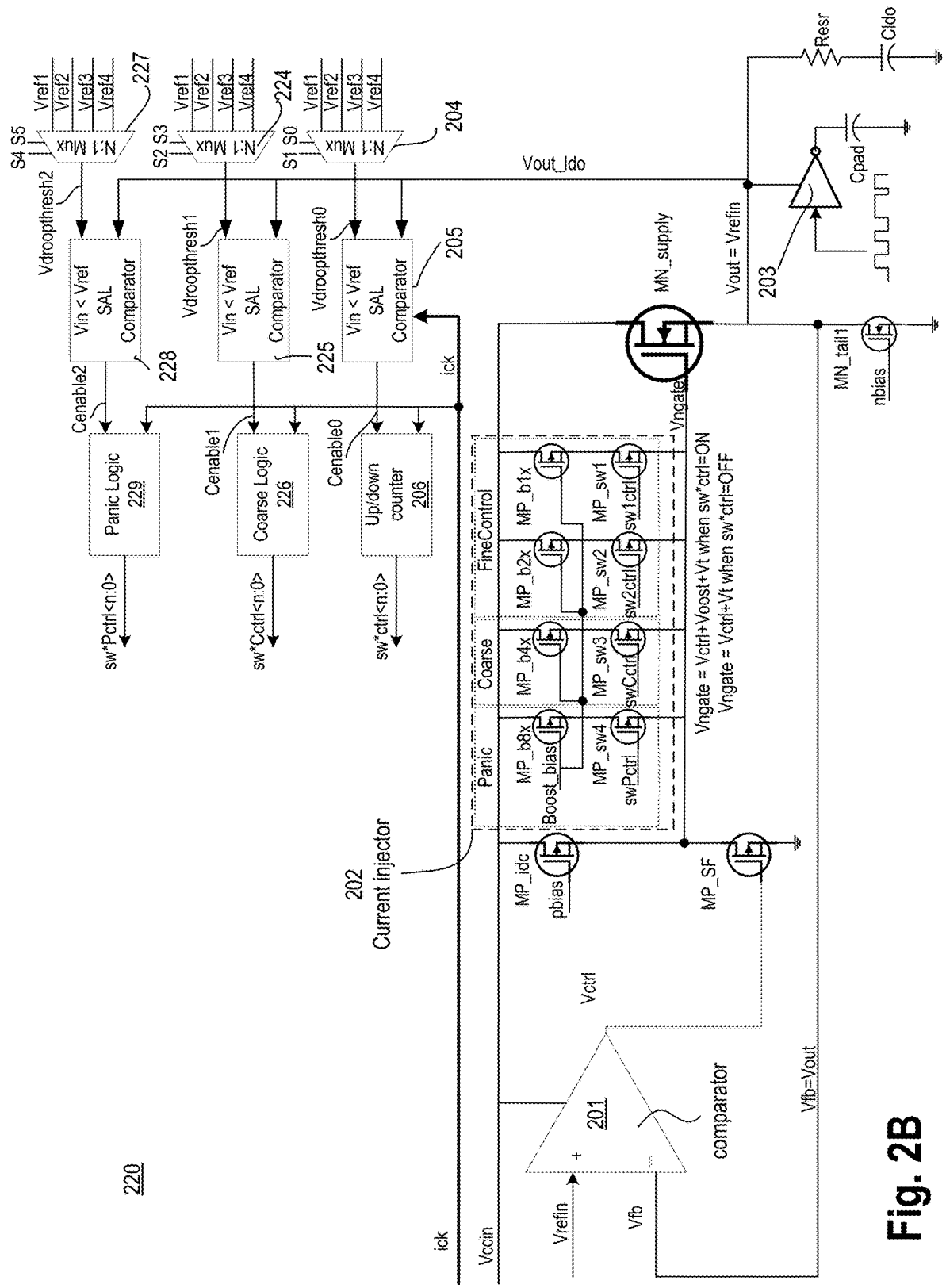
FIG. 2B illustrates the integrated dual loop voltage regulator with a dynamic digital loop, in accordance with some embodiments.

FIG. 2B illustrates integrated dual loop voltage regulator 220 with a dynamic digital loop, in accordance with some embodiments. Compared to regulator 220, here additional controls are provided to adjust current from current injector 202. The additional controls include panic, coarse, and fine controls. These controls are generated by different logic. For example, fine control is generated by MUX 204, comparator 205, and counter 206 as discussed with reference to FIG. 2A. MUX 204 generates Vdrropthresh0 which can be static or dynamically changed by selecting S1 and S0 select signals. The output of comparator 205 is Cenable0. Here, sw*cntrl from counter 206 is used to control MP_sw2 and MP_sw1, which are smaller in size compared to MP_sw3 and MP_sw4. As such, sw*cntrl provides fine current injection to the gate node Vngate. In some embodiments, coarse control sw*Ccntl is used to control MP_sw3. In some embodiments, coarse control sw*Ccntl is generated by MUX 224, comparator 225, and logic 226. MUX 224 is same as MUX 204. MUX 224 generates Vdrropthresh1 which can be static or dynamically changed by selecting S2 and S1 select signals. The output of comparator 225 is Cenable1. MUX 227 generates Vdrropthresh2 which can be static or dynamically changed by selecting S4 and S5 select signals. The output of comparator 225 is Cenable1. Comparator 225 can be same as comparator 205. In some embodiments, panic control sw*Pcntl is used to control MP_sw4. In some embodiments, panic control sw*Pcntl is generated by MUX 227, comparator 228, and logic 229. MUX 227 is same as MUX 204. Comparator 228 can be same as comparator 205.

The control circuitry comprises a stable Vref ladder with multiple multiplexers (204, 224, and 227) to control the thresholds (Vdroopthresh0, Vdroopthresh1, Vdroopthresh2) at which the noise is being tracked. The threshold is compared against the output (Vout_ldo) of the LDO to decide the amount of boost needed to bring the droop or overshoot to within tolerable levels. Once the threshold crosses a certain Vref, the comparator flips and the control signals turn the booster(s) on. To track noise, additional comparators are employed to detect different noise thresholds during an event where the fine comparator 205 and controls are not enough to bring the noise down to tolerable levels. Unlike, the fine control sw*ctrl, the coarse control sw*Cctrl directly turns on a bigger device in current injector 202 to pump more charge into the boost node Vngate. The source follower MN_supply being a power switch, will react to these large differences of Vgs with more current, and bringing back the noise to tolerable level. Coarse control logic 226 along with the fine switches MP_sw2 and MP_sw1 will be then used to release the control back to the tracking bandwidth of the LDO. Unlike, the fine control scode w*ctrl and coarse control code sw*Cctrl, panic control code sw*Pctrl directly turns on the largest device MP_sw4 in current injector 202 to pump more charge into the boost node Vngate. The source follower MN_supply being a power switch, will react to these large differences of Vgs with more current, and bringing back the noise to tolerable level. Panic control logic 229 along with the coarse switches MP_sw3 and fine switches MP_sw2 and MP_sw1 will be then used to release the control back to the tracking bandwidth of the LDO. The initial thresholds could be set to a certain percentage of the total allowed noise spec that can be tolerated in the system. This will ensure that the coarse control is turned on before the output of LDO goes below the tolerable limits. As discussed with reference to FIG. 2A, the current injection devices can be thermometer coded outputs of counter 206, coarse logic 226, and panic logic 229 are thermometer codes.

Figure 3:
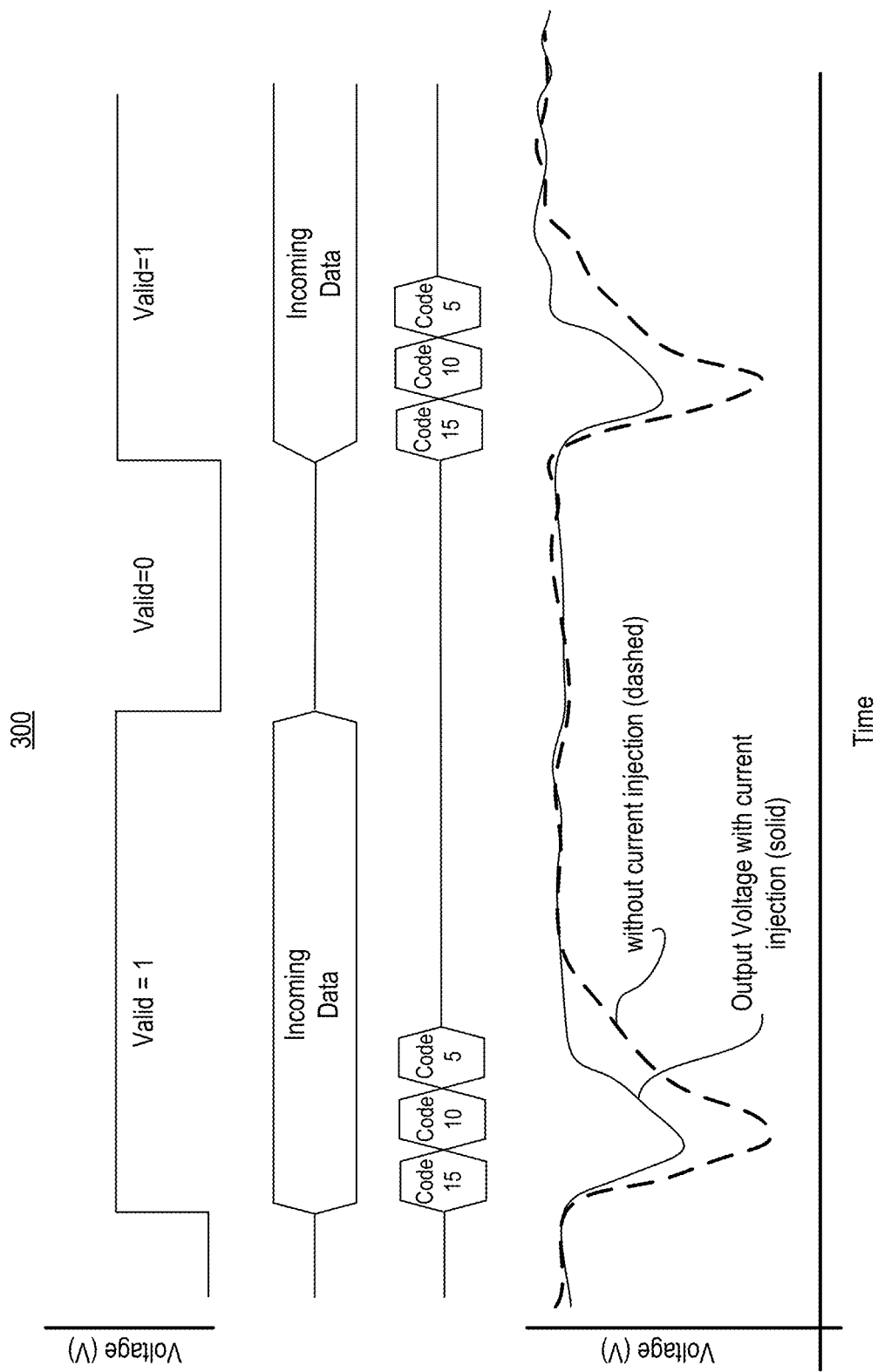
FIG. 3 illustrates a timing diagram for current injection by the dual loop voltage regulator, in accordance with some embodiments.

FIG. 3 illustrates timing diagram 300 for current injection by the dual loop voltage regulator 200, in accordance with some embodiments. Timing diagram 300 shows a waveform of valid data, where valid=1 indicates incoming data while valid=0 indicates no incoming data. Here, code shows the integer value of code sw*ctrl, an output of counter 206. The waveform at the bottom show the impact of current injector 202.

In some embodiments, the second loop turns on current injector 202 at the beginning of a valid indication if LDO VR 200 is being used for patterns that are guaranteed to always have transitions (scrambling). The valid indication which is an asserted signal having a pulse width of a duration encompassing incoming data. Conversely, a valid indication which is a de-asserted signal has a pulse width of a duration where there is no data. By turning on current injector 202, the first droop on the output supply node is reduced and LDO 200 is enabled to regulate the output voltage Vout using the first loop. Since the scrambler ensures B-I-B step size is not from 0 to maximum, based on the valid indication, all the current injector legs (e.g., MP_b8x through MP_b1x) are turned on once for maximum current injection on the output supply node Vout reducing the logic and detector complexity.

If the data is not scrambled, the first droop could be anywhere in the valid region. In various embodiments, comparator 205 is a high-speed comparator which compares the output Vout of LDO 200 with a configurable reference Vdroopthresh, and in the event of droop detection below the configurable reference Vdroopthresh, turns on current injector 202 till the droop on Vout recovers back. The first loop has a slower response than the second loop. For example, the second loop operates between 1 to 2 GHz while the first loop operates around 300 MHz. This auxiliary loop or second loop tracks the high BW beyond 300 MHz till clock frequency and LDO tracks DC to 300 MHz.

In some embodiments, the output Cenable of high-speed comparator 205 is given to up/down counter 206 enabling some or all of the current injector legs (e.g., MP_b8x through MP_b1x) at once, and disabling the current injector legs (e.g., MP_b8x through MP_b1x) slowly based on the output Cenable of high-speed comparator 205. In some embodiments, the current from current injector 202 starts with maximum injection. This current is almost instantaneous since there is no capacitor on this node and is driven off a source follower, in accordance with some embodiments.

In some embodiments, the injector current from injector 202 is altered to a reduced value after one cycle of LDO's closed loop bandwidth (e.g., the bandwidth of the first loop). As such, voltage fluctuations on the output node Vout of the regulator is prevented. In some embodiments, injector 202 is switched off either after fixed number of clock cycles in fully-on case or when comparator 205 indicates the droop has recovered (whichever is best for noise reduction based on implementation).

Typically, a high frequency noise on regulator 200 should be taken care by the device decaps. However, due to the series resistances of decaps and BW limitations, a portion of the high frequency noise appears on load 203. With the current boost from injector 202, the overall noise is reduced to the high frequency portion. Here, the waveforms for the no current injector case and the case with current injector starts converging to a same value once LDO 200 stabilizes to the load current and comparator 205 is off. In various embodiments, the charge injection mechanism improves power supply noise on Vout node. This enables the scheme of various embodiments to scale for voltages without worrying about headroom requirement of LDO 200. In case of the option where comparator 205 cannot be employed due to timing complications or higher burst-idle-burst frequency, injector 202 can be turned on at full strength. If the data ends up being all zeros (with certain probability), the gate voltage Vngate goes up as a function of boost, but the output Vout may not change much since Vgs of MN_supply is still relatively low.

Figure 4:
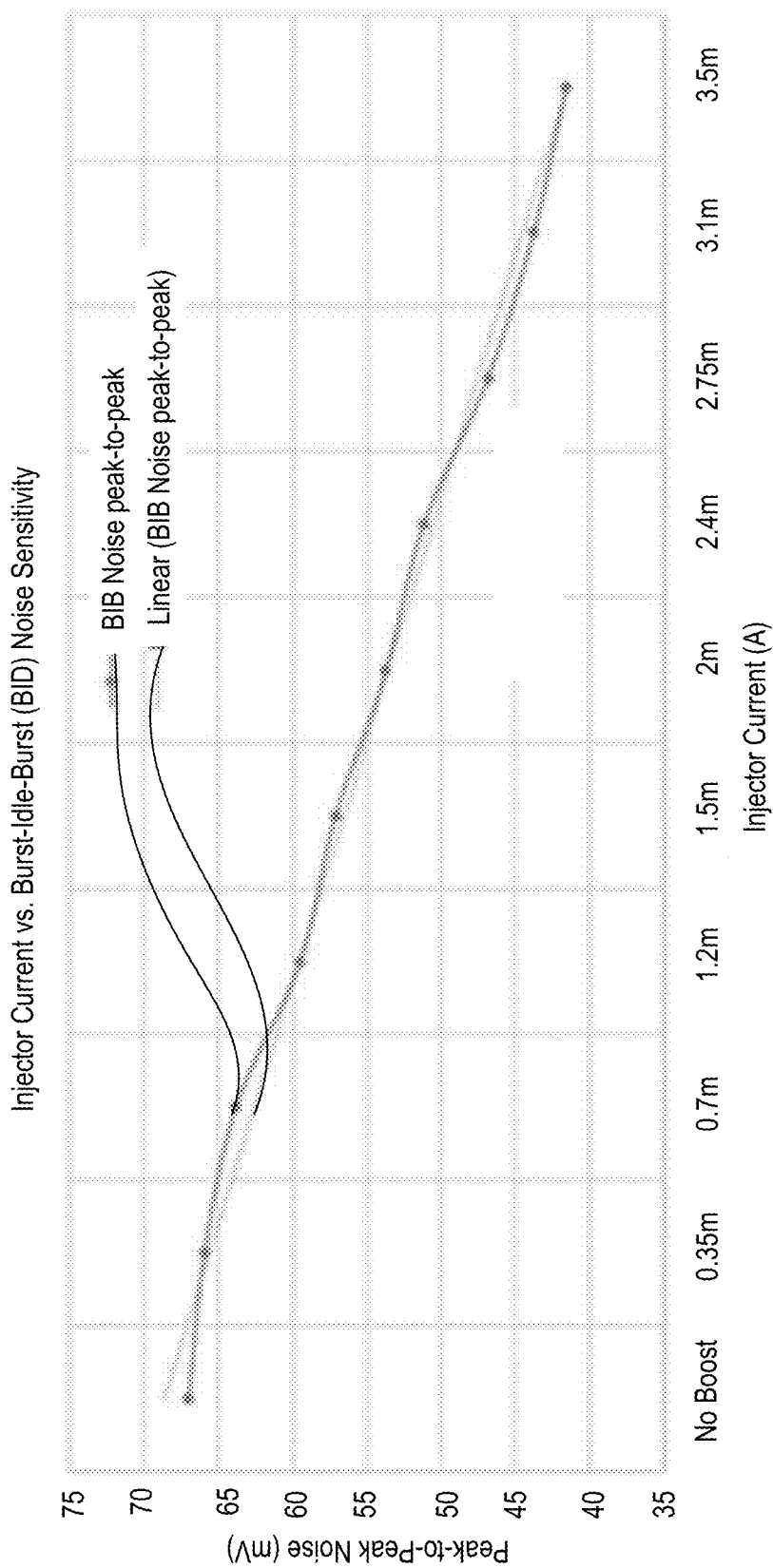
FIG. 4 illustrates a plot showing droop sensitivity to current injection by the dual loop voltage regulator, in accordance with some embodiments.

FIG. 4 illustrates plot 400 showing droop sensitivity to current injection by the dual loop voltage regulator, in accordance with some embodiments. In one example, with a 70 mV PSN, the peak-to-peak jitter of LDO 200 under test is 92.3 ps and period jitter is 34.5 ps. When PSN reduces to 45 mV (with 3.5 mA injection current), peak-to-peak jitter reduces to 56 ps and period jitter reduces to 21.5 ps giving a reduction of 40% for both peak-to-peak jitter and period jitter. In some examples deterministic jitter (Dj) is calculated by multiplying the power supply sensitivity to the delay normalized to unit mV and verified against an eye spread.

Figure 5:
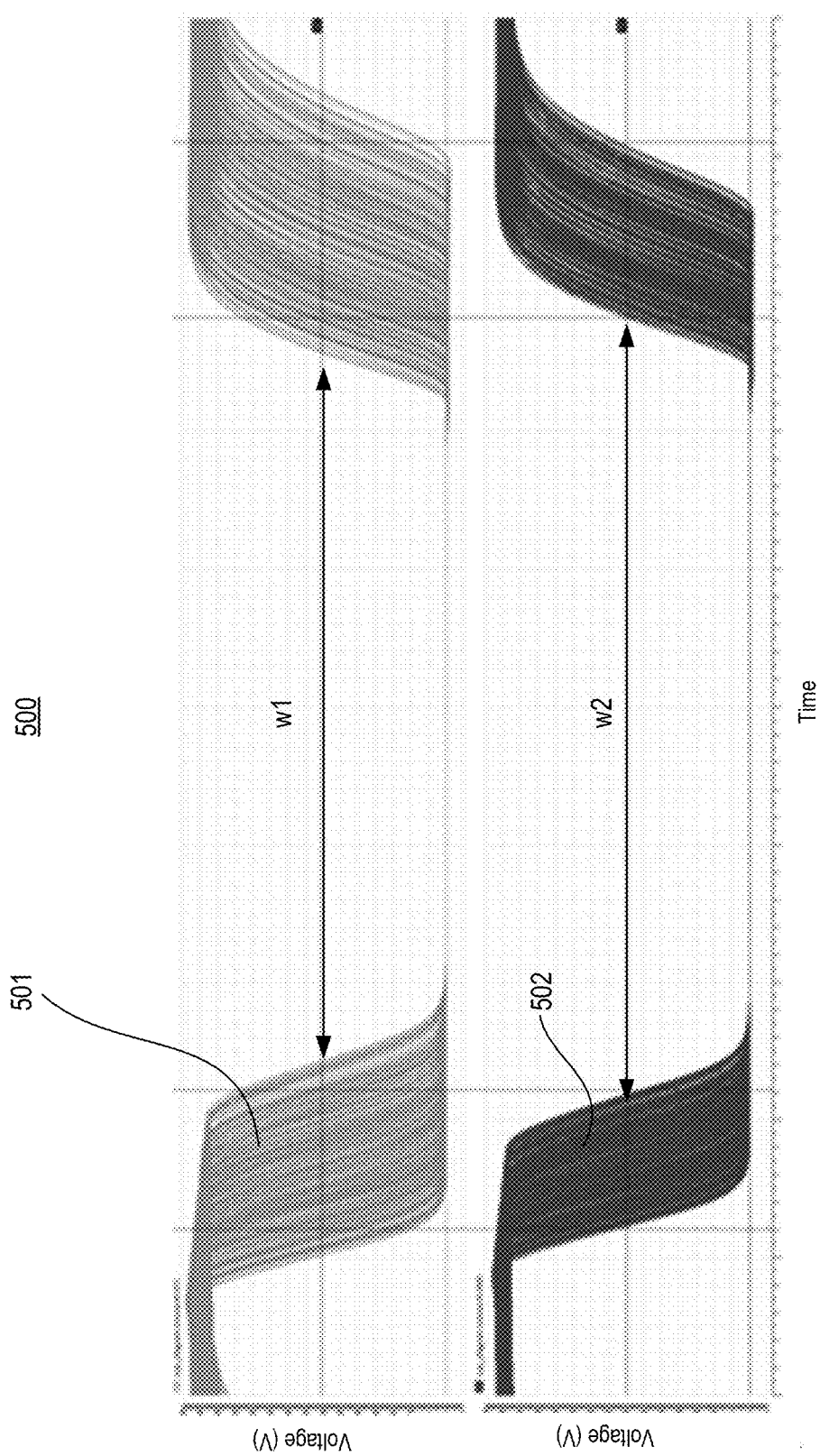
FIG. 5 illustrates a set of plots showing an eye diagram for noise with and without current injector, in accordance with some embodiments.

FIG. 5 illustrates a set of plots 500 shown an eye diagram for noise with and without current injector, in accordance with some embodiments. The eye diagram for the PSN jitter reduction illustrated by plot 500, where the top 501 and bottom 502 traces have roughly the same delay and the effective pulse width (w2) is much higher in the bottom trace that the effective pulse width of the top trace. The PSN has been reduced with the help of injector 202. Plot 500 indicates that an IO can be operated faster using the dual loop LDO mechanism and thus enhancing the BW/sq·mm or reducing Vcc to obtain same margin, which reduces overall pJ/bit at slight expense of LDO idle power.

Table 1 summarizes the increase in quiescent current for various loads and different usage models. The always ON is same as 1% AF (activity factor), since the B-I-B for always ON happens once in a lifetime at which point the LDO 200 supplies maximum current injection. The scheme of various embodiments enables the load step response from idle with 0 load current to maximum load current in one cycle without use of high frequency amplifiers and charge pumps. This also provides an alternate way to remove any additional circuitry used for scrambling which saves power and latency.

TABLE 1

| Workload of the Tx drivers | Injector Current (mA) | Injector Time (ns) | Idle power (mW) | Scaling Factor | Total Idle power (mW) | Load Current (mA) | Efficiency @ 30% dropout | Efficiency @ 50% dropout |
| --- | --- | --- | --- | --- | --- | --- | --- | --- |
| 1% AF | 3.5 | 3 | 3.5 | 0.06 | 3.71 | 155 | 0.684 | 0.488 |
| 5% AF | 3.5 | 3 | 3.5 | 0.30 | 4.55 | 155 | 0.680 | 0.486 |
| 10% AF | 3.5 | 3 | 3.5 | 0.60 | 5.6 | 155 | 0.676 | 0.483 |
| 20% AF | 3.5 | 3 | 3.5 | 1.20 | 7.7 | 155 | 0.667 | 0.476 |
| 25% AF | 3.5 | 3 | 3.5 | 1.50 | 8.75 | 155 | 0.663 | 0.473 |
| 35% AF | 3.5 | 3 | 3.5 | 2.10 | 10.85 | 155 | 0.654 | 0.467 |
| Always ON | 3.5 | 3 | 3.5 | 0 | 3.5 | 155 | 0.685 | 0.489 |

In various embodiments, the dynamic control of Vdroopthresh based on data pattern at load 203 is controlled by computer-executable instructions. Elements of embodiments are also provided as a machine-readable medium (e.g., NVM 111) for storing the computer-executable instructions (e.g., instructions to implement any other processes discussed herein). In some embodiments, computing platform comprises memory, processor, machine-readable storage media (also referred to as tangible machine-readable medium), communication interface (e.g., wireless or wired interface), and network bus coupled together.

In some embodiments, the logic that controls S0 and S1 signals for Mux 204 comprises a processor which is a Digital Signal Processor (DSP), an Application Specific Integrated Circuit (ASIC), a general-purpose Central Processing Unit (CPU), or a low power logic implementing a simple finite state machine to perform the method of dynamically controlling S0 and S1 to adaptively adjust Vdroopthresh.

In some embodiments, the various logic blocks of the logic are coupled together via a Network Bus. Any suitable protocol may be used to implement the network bus. In some embodiments, machine-readable storage medium includes instructions (also referred to as the program software code/instructions) for calculating or measuring distance and relative orientation of a device with reference to another device as described with reference to various embodiments and flowchart.

Program software code/instructions associated with various embodiments executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with various embodiments are executed by system.

In some embodiments, the program software code/instructions associated with various embodiments are stored in a computer executable storage medium and executed by the processor. Here, computer executable storage medium is a tangible machine-readable medium that can be used to store program software code/instructions and data that, when executed by a computing device, causes one or more processors to perform a method(s) as may be recited in one or more accompanying claims directed to the disclosed subject matter.

The tangible machine-readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions, associated with various embodiments, and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), ferroelectric memory, resistive RAM, phase change memory (PCM), magnetic RAM (MRAM, among others. The software program code/instructions may be temporarily stored in digital tangible communication links while implementing electrical, optical, acoustical or other forms of propagating signals, such as carrier waves, infrared signals, digital signals, etc. through such tangible communication links.

In general, tangible machine readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

Figure 6:
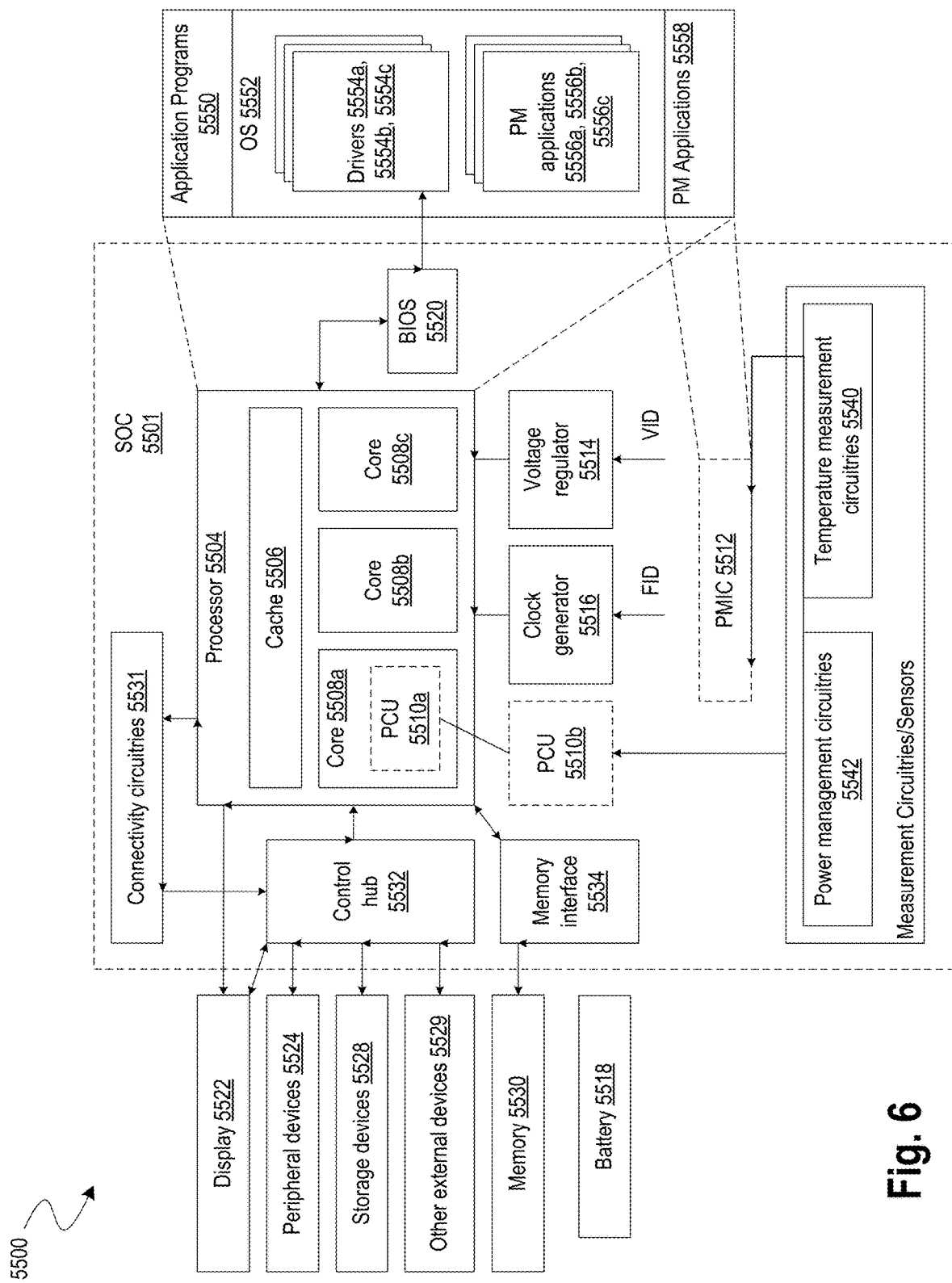
FIG. 6 illustrates a smart device or a computer system or an SoC (System-on-Chip) with integrated dual loop voltage regulator, in accordance with some embodiments.

FIG. 6 illustrates a smart device or a computer system or an SoC (System-on-Chip) with integrated dual loop voltage regulator, in accordance with some embodiments. It is pointed out that those elements of FIG. 6 having the same reference numbers (or names) as the elements of any other figure may operate or function in any manner similar to that described, but are not limited to such. Any block in this smart device can have the apparatus for dynamically optimizing battery charging voltage.

In some embodiments, device 5500 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 5500.

In an example, the device 5500 comprises an SoC (System-on-Chip) 5501. An example boundary of the SoC 5501 is illustrated using dotted lines in FIG. 6, with some example components being illustrated to be included within SoC 5501—however, SoC 5501 may include any appropriate components of device 5500.

In some embodiments, device 5500 includes processor 5504. Processor 5504 can include one or more physical devices, such as microprocessors, application processors, microcontrollers, programmable logic devices, processing cores, or other processing implementations such as disaggregated combinations of multiple compute, graphics, accelerator, I/O and/or other processing chips. The processing operations performed by processor 5504 include the execution of an operating platform or operating system on which applications and/or device functions are executed. The processing operations include operations related to I/O (input/output) with a human user or with other devices, operations related to power management, operations related to connecting computing device 5500 to another device, and/or the like. The processing operations may also include operations related to audio I/O and/or display I/O.

In some embodiments, processor 5504 includes multiple processing cores (also referred to as cores) 5508a, 5508b, 5508c. Although merely three cores 5508a, 5508b, 5508c are illustrated in FIG. 4, processor 5504 may include any other appropriate number of processing cores, e.g., tens, or even hundreds of processing cores. Processor cores 5508a, 5508b, 5508c may be implemented on a single integrated circuit (IC) chip. Moreover, the chip may include one or more shared and/or private caches, buses or interconnections, graphics and/or memory controllers, or other components.

In some embodiments, processor 5504 includes cache 5506. In an example, sections of cache 5506 may be dedicated to individual cores 5508 (e.g., a first section of cache 5506 dedicated to core 5508a, a second section of cache 5506 dedicated to core 5508b, and so on). In an example, one or more sections of cache 5506 may be shared among two or more of cores 5508. Cache 5506 may be split in different levels, e.g., level 1 (L1) cache, level 2 (L2) cache, level 3 (L3) cache, etc.

In some embodiments, processor core 5504 may include a fetch unit to fetch instructions (including instructions with conditional branches) for execution by the core 5504. The instructions may be fetched from any storage devices such as the memory 5530. Processor core 5504 may also include a decode unit to decode the fetched instruction. For example, the decode unit may decode the fetched instruction into a plurality of micro-operations. Processor core 5504 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 5504 may be an out-of-order processor core in one embodiment. Processor core 5504 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 5504 may also include a bus unit to enable communication between components of processor core 5504 and other components via one or more buses. Processor core 5504 may also include one or more registers to store data accessed by various components of the core 5504 (such as values related to assigned app priorities and/or sub-system states (modes) association.

In some embodiments, device 5500 comprises connectivity circuitries 5531. For example, connectivity circuitries 5531 includes hardware devices (e.g., wireless and/or wired connectors and communication hardware) and/or software components (e.g., drivers, protocol stacks), e.g., to enable device 5500 to communicate with external devices. Device 5500 may be separate from the external devices, such as other computing devices, wireless access points or base stations, etc.

In an example, connectivity circuitries 5531 may include multiple different types of connectivity. To generalize, the connectivity circuitries 5531 may include cellular connectivity circuitries, wireless connectivity circuitries, etc. Cellular connectivity circuitries of connectivity circuitries 5531 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 5531 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 5531 may include a network interface, such as a wired or wireless interface, e.g., so that a system embodiment may be incorporated into a wireless device, for example, a cell phone or personal digital assistant.

In some embodiments, device 5500 comprises control hub 5532, which represents hardware devices and/or software components related to interaction with one or more I/O devices. For example, processor 5504 may communicate with one or more of display 5522, one or more peripheral devices 5524, storage devices 5528, one or more other external devices 5529, etc., via control hub 5532. Control hub 5532 may be a chipset, a Platform Control Hub (PCH), and/or the like.

For example, control hub 5532 illustrates one or more connection points for additional devices that connect to device 5500, e.g., through which a user might interact with the system. For example, devices (e.g., devices 5529) that can be attached to device 5500 include microphone devices, speaker or stereo systems, audio devices, video systems or other display devices, keyboard or keypad devices, or other I/O devices for use with specific applications such as card readers or other devices.

As mentioned above, control hub 5532 can interact with audio devices, display 5522, etc. For example, input through a microphone or other audio device can provide input or commands for one or more applications or functions of device 5500. Additionally, audio output can be provided instead of, or in addition to display output. In another example, if display 5522 includes a touch screen, display 5522 also acts as an input device, which can be at least partially managed by control hub 5532. There can also be additional buttons or switches on computing device 5500 to provide I/O functions managed by control hub 5532. In one embodiment, control hub 5532 manages devices such as accelerometers, cameras, light sensors or other environmental sensors, or other hardware that can be included in device 5500. The input can be part of direct user interaction, as well as providing environmental input to the system to influence its operations (such as filtering for noise, adjusting displays for brightness detection, applying a flash for a camera, or other features).

In some embodiments, control hub 5532 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 5522 represents hardware (e.g., display devices) and software (e.g., drivers) components that provide a visual and/or tactile display for a user to interact with device 5500. Display 5522 may include a display interface, a display screen, and/or hardware device used to provide a display to a user. In some embodiments, display 5522 includes a touch screen (or touch pad) device that provides both output and input to a user. In an example, display 5522 may communicate directly with the processor 5504. Display 5522 can be one or more of an internal display device, as in a mobile electronic device or a laptop device or an external display device attached via a display interface (e.g., DisplayPort, etc.). In one embodiment display 5522 can be a head mounted display (HMD) such as a stereoscopic display device for use in virtual reality (VR) applications or augmented reality (AR) applications.

In some embodiments, and although not illustrated in the figure, in addition to (or instead of) processor 5504, device 5500 may include Graphics Processing Unit (GPU) comprising one or more graphics processing cores, which may control one or more aspects of displaying contents on display 5522.

Control hub 5532 (or platform controller hub) may include hardware interfaces and connectors, as well as software components (e.g., drivers, protocol stacks) to make peripheral connections, e.g., to peripheral devices 5524.

It will be understood that device 5500 could both be a peripheral device to other computing devices, as well as have peripheral devices connected to it. Device 5500 may have a "docking" connector to connect to other computing devices for purposes such as managing (e.g., downloading and/or uploading, changing, synchronizing) content on device 5500. Additionally, a docking connector can allow device 5500 to connect to certain peripherals that allow computing device 5500 to control content output, for example, to audiovisual or other systems.

In addition to a proprietary docking connector or other proprietary connection hardware, device 5500 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 5531 may be coupled to control hub 5532, e.g., in addition to, or instead of, being coupled directly to the processor 5504. In some embodiments, display 5522 may be coupled to control hub 5532, e.g., in addition to, or instead of, being coupled directly to processor 5504.

In some embodiments, device 5500 comprises memory 5530 coupled to processor 5504 via memory interface 5534. Memory 5530 includes memory devices for storing information in device 5500.

In some embodiments, memory 5530 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 5530 can be a dynamic random-access memory (DRAM) device, a static random-access memory (SRAM) device, flash memory device, phase-change memory device, or some other memory device having suitable performance to serve as process memory. In one embodiment, memory 5530 can operate as system memory for device 5500, to store data and instructions for use when the one or more processors 5504 executes an application or process. Memory 5530 can store application data, user data, music, photos, documents, or other data, as well as system data (whether long-term or temporary) related to the execution of the applications and functions of device 5500.

Elements of various embodiments and examples are also provided as a machine-readable medium (e.g., memory 5530) for storing the computer-executable instructions (e.g., instructions to implement any other processes discussed herein). The machine-readable medium (e.g., memory 5530) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 5500 comprises temperature measurement circuitries 5540, e.g., for measuring temperature of various components of device 5500. In an example, temperature measurement circuitries 5540 may be embedded, or coupled or attached to various components, whose temperature are to be measured and monitored. For example, temperature measurement circuitries 5540 may measure temperature of (or within) one or more of cores 5508*a*, 5508*b*, 5508*c*, voltage regulator 5514, memory 5530, a mother-board of SoC 5501, and/or any appropriate component of device 5500. In some embodiments, temperature measurement circuitries 5540 include a low power hybrid reverse (LPHR) bandgap reference (BGR) and digital temperature sensor (DTS), which utilizes subthreshold metal oxide semiconductor (MOS) transistor and the PNP parasitic Bi-polar Junction Transistor (BJT) device to form a reverse BGR that serves as the base for configurable BGR or DTS operating modes. The LPHR architecture uses low-cost MOS transistors and the standard parasitic PNP device. Based on a reverse bandgap voltage, the LPHR can work as a configurable BGR. By comparing the configurable BGR with the scaled base-emitter voltage, the circuit can also perform as a DTS with a linear transfer function with single-temperature trim for high accuracy.

In some embodiments, device 5500 comprises power measurement circuitries 5542, e.g., for measuring power consumed by one or more components of the device 5500. In an example, in addition to, or instead of, measuring power, the power measurement circuitries 5542 may measure voltage and/or current. In an example, the power measurement circuitries 5542 may be embedded, or coupled or attached to various components, whose power, voltage, and/or current consumption are to be measured and monitored. For example, power measurement circuitries 5542 may measure power, current and/or voltage supplied by one or more voltage regulators 5514, power supplied to SoC 5501, power supplied to device 5500, power consumed by processor 5504 (or any other component) of device 5500, etc.

In some embodiments, device 5500 comprises one or more voltage regulator circuitries, generally referred to as voltage regulator (VR) 5514. VR 5514 generates signals at appropriate voltage levels, which may be supplied to operate any appropriate components of the device 5500. Merely as an example, VR 5514 is illustrated to be supplying signals to processor 5504 of device 5500. In some embodiments, VR 5514 receives one or more Voltage Identification (VID) signals, and generates the voltage signal at an appropriate level, based on the VID signals. Various type of VRs may be utilized for the VR 5514. For example, VR 5514 may include a "buck" VR, "boost" VR, a combination of buck and boost VRs, low dropout (LDO) regulators, switching DC-DC regulators, constant-on-time controller-based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 5510*a/b* and/or PMIC 5512. In some embodiments, each core has a network of distributed LDOs to provide efficient control for power management. The LDOs can be digital, analog, or a combination of digital or analog LDOs. In some embodiments, VR 5514 includes current tracking apparatus to measure current through power supply rail(s).

In some embodiments, VR 5514 includes a digital control scheme to manage states of a proportional-integral-derivative (PID) filter (also known as a digital Type-III compensator). The digital control scheme controls the integrator of the PID filter to implement non-linear control of saturating the duty cycle during which the proportional and derivative terms of the PID are set to 0 while the integrator and its internal states (previous values or memory) is set to a duty cycle that is the sum of the current nominal duty cycle plus a deltaD. The deltaD is the maximum duty cycle increment that is used to regulate a voltage regulator from ICCmin to ICCmax and is a configuration register that can be set post silicon. A state machine moves from a non-linear all ON state (which brings the output voltage Vout back to a regulation window) to an open loop duty cycle which maintains the output voltage slightly higher than the required reference voltage Vref. After a certain period in this state of open loop at the commanded duty cycle, the state machine then ramps down the open loop duty cycle value until the output voltage is close to the Vref commanded. As such, output chatter on the output supply from VR 5514 is completely eliminated (or substantially eliminated) and there is merely a single undershoot transition which could lead to a guaranteed Vmin based on a comparator delay and the di/dt of the load with the available output decoupling capacitance.

In some embodiments, VR 5514 includes a separate self-start controller, which is functional without fuse and/or trim information. The self-start controller protects VR 5514 against large inrush currents and voltage overshoots, while being capable of following a variable VID (voltage identification) reference ramp imposed by the system. In some embodiments, the self-start controller uses a relaxation oscillator built into the controller to set the switching frequency of the buck converter. The oscillator can be initialized using either a clock or current reference to be close to a desired operating frequency. The output of VR 5514 is coupled weakly to the oscillator to set the duty cycle for closed loop operation. The controller is naturally biased such that the output voltage is always slightly higher than the set point, eliminating the need for any process, voltage, and/or temperature (PVT) imposed trims.

In some embodiments, device 5500 comprises one or more clock generator circuitries, generally referred to as clock generator 5516. Clock generator 5516 generates clock signals at appropriate frequency levels, which may be supplied to any appropriate components of device 5500. Merely as an example, clock generator 5516 is illustrated to be supplying clock signals to processor 5504 of device 5500. In some embodiments, clock generator 5516 receives one or more Frequency Identification (FID) signals, and generates the clock signals at an appropriate frequency, based on the FID signals.

In some embodiments, device 5500 comprises battery 5518 supplying power to various components of device 5500. Merely as an example, battery 5518 is illustrated to be supplying power to processor 5504. Although not illustrated in the figures, device 5500 may comprise a charging circuitry, e.g., to recharge the battery, based on Alternating Current (AC) power supply received from an AC adapter.

In some embodiments, battery 5518 periodically checks an actual battery capacity or energy with charge to a preset voltage (e.g., 4.1 V). The battery then decides of the battery capacity or energy. If the capacity or energy is insufficient, then an apparatus in or associated with the battery slightly increases charging voltage to a point where the capacity is sufficient (e.g. from 4.1 V to 4.11 V). The process of periodically checking and slightly increase charging voltage is performed until charging voltage reaches specification limit (e.g., 4.2 V). The scheme described herein has benefits such as battery longevity can be extended, risk of insufficient energy reserve can be reduced, burst power can be used as long as possible, and/or even higher burst power can be used.

In some embodiments, the charging circuitry (e.g., 5518) comprises a buck-boost converter. This buck-boost converter comprises DrMOS or DrGaN devices used in place of half-bridges for traditional buck-boost converters. Various embodiments here are described with reference to DrMOS. However, the embodiments are applicable to DrGaN. The DrMOS devices allow for better efficiency in power conversion due to reduced parasitic and optimized MOSFET packaging. Since the dead-time management is internal to the DrMOS, the dead-time management is more accurate than for traditional buck-boost converters leading to higher efficiency in conversion. Higher frequency of operation allows for smaller inductor size, which in turn reduces the z-height of the charger comprising the DrMOS based buck-boost converter. The buck-boost converter of various embodiments comprises dual-folded bootstrap for DrMOS devices. In some embodiments, in addition to the traditional bootstrap capacitors, folded bootstrap capacitors are added that cross-couple inductor nodes to the two sets of DrMOS switches.

In some embodiments, device 5500 comprises Power Control Unit (PCU) 5510 (also referred to as Power Management Unit (PMU), Power Management Controller (PMC), Power Unit (p-unit), etc.). In an example, some sections of PCU 5510 may be implemented by one or more processing cores 5508, and these sections of PCU 5510 are symbolically illustrated using a dotted box and labelled PCU 5510a. In an example, some other sections of PCU 5510 may be implemented outside the processing cores 5508, and these sections of PCU 5510 are symbolically illustrated using a dotted box and labelled as PCU 5510b. PCU 5510 may implement various power management operations for device 5500. PCU 5510 may include hardware interfaces, hardware circuitries, connectors, registers, etc., as well as software components (e.g., drivers, protocol stacks), to implement various power management operations for device 5500.

In various embodiments, PCU or PMU 5510 is organized in a hierarchical manner forming a hierarchical power management (HPM). HPM of various embodiments builds a capability and infrastructure that allows for package level management for the platform, while still catering to islands of autonomy that might exist across the constituent die in the package. HPM does not assume a pre-determined mapping of physical partitions to domains. An HPM domain can be aligned with a function integrated inside a dielet, to a dielet boundary, to one or more dielets, to a companion die, or even a discrete CXL device. HPM addresses integration of multiple instances of the same die, mixed with proprietary functions or 3rd party functions integrated on the same die or separate die, and even accelerators connected via CXL (e.g., Flexbus) that may be inside the package, or in a discrete form factor.

HPM enables designers to meet the goals of scalability, modularity, and late binding. HPM also allows PMU functions that may already exist on other dice to be leveraged, instead of being disabled in the flat scheme. HPM enables management of any arbitrary collection of functions independent of their level of integration. HPM of various embodiments is scalable, modular, works with symmetric multi-chip processors (MCPs), and works with asymmetric MCPs. For example, HPM does not need a signal PM controller and package infrastructure to grow beyond reasonable scaling limits. HPM enables late addition of a die in a package without the need for change in the base die infrastructure. HPM addresses the need of disaggregated solutions having dies of different process technology nodes coupled in a single package. HPM also addresses the needs of companion die integration solutions—on and off package.

In various embodiments, each die (or dielet) includes a power management unit (PMU) or p-unit. For example, processor dies can have a supervisor p-unit, supervisee p-unit, or a dual role supervisor/supervisee p-unit. In some embodiments, an I/O die has its own dual role p-unit such as supervisor and/or supervisee p-unit. The p-units in each die can be instances of a generic p-unit. In one such example, all p-units have the same capability and circuits, but are configured (dynamically or statically) to take a role of a supervisor, supervisee, and/or both. In some embodiments, the p-units for compute dies are instances of a compute p-unit while p-units for IO dies are instances of an IO p-unit different from the compute p-unit. Depending on the role, p-unit acquires specific responsibilities to manage power of the multichip module and/or computing platform. While various p-units are described for dies in a multichip module or system-on-chip, a p-unit can also be part of an external device such as I/O device.

Here, the various p-units do not have to be the same. The HPM architecture can operate very different types of p-units. One common feature for the p-units is that they are expected to receive HPM messages and are expected to be able to comprehend them. In some embodiments, the p-unit of IO dies may be different than the p-unit of the compute dies. For example, the number of register instances of each class of register in the IO p-unit is different than those in the p-units of the compute dies. An IO die has the capability of being an HPM supervisor for CXL connected devices, but compute die may not need to have that capability. The IO and computes dice also have different firmware flows and possibly different firmware images. These are choices that an implementation can make. An HPM architecture can choose to have one superset firmware image and selectively execute flows that are relevant to the die type the firmware is associated with. Alternatively, there can be a customer firmware for each p-unit type; it can allow for more streamlined sizing of the firmware storage requirements for each p-unit type.

The p-unit in each die can be configured as a supervisor p-unit, supervisee p-unit or with a dual role of supervisor/supervisee. As such, p-units can perform roles of supervisor or supervisee for various domains. In various embodiments, each instance of p-unit is capable of autonomously managing local dedicated resources and contains structures to aggregate data and communicate between instances to enable shared resource management by the instance configured as the shared resource supervisor. A message and wire-based infrastructure is provided that can be duplicated and configured to facilitate management and flows between multiple p-units.

In some embodiments, power and thermal thresholds are communicated by a supervisor p-unit to supervisee p-units. For example, a supervisor p-unit learns of the workload (present and future) of each die, power measurements of each die, and other parameters (e.g., platform level power boundaries) and determines new power limits for each die. These power limits are then communicated by supervisor p-units to the supervisee p-units via one or more interconnects and fabrics. In some embodiments, a fabric indicates a group of fabrics and interconnect including a first fabric, a second fabric, and a fast response interconnect. In some embodiments, the first fabric is used for common communication between a supervisor p-unit and a supervisee p-unit. These common communications include change in voltage, frequency, and/or power state of a die which is planned based on a number of factors (e.g., future workload, user behavior, etc.). In some embodiments, the second fabric is used for higher priority communication between supervisor p-unit and supervisee p-unit. Example of higher priority communication include a message to throttle because of a possible thermal runaway condition, reliability issue, etc. In some embodiments, a fast response interconnect is used for communicating fast or hard throttle of all dies. In this case, a supervisor p-unit may send a fast throttle message to all other p-units, for example. In some embodiments, a fast response interconnect is a legacy interconnect whose function can be performed by the second fabric.

The HPM architecture of various embodiments enables scalability, modularity, and late binding of symmetric and/or asymmetric dies. Here, symmetric dies are dies of same size, type, and/or function, while asymmetric dies are dies of different size, type, and/or function. Hierarchical approach also allows PMU functions that may already exist on other dice to be leveraged, instead of being disabled in the traditional flat power management scheme. HPM does not assume a pre-determined mapping of physical partitions to domains. An HPM domain can be aligned with a function integrated inside a dielet, to a dielet boundary, to one or more dielets, to a companion die, or even a discrete CXL device. HPM enables management of any arbitrary collection of functions independent of their level of integration. In some embodiments, a p-unit is declared a supervisor p-unit based on one or more factors. These factors include memory size, physical constraints (e.g., number of pin-outs), and locations of sensors (e.g., temperature, power consumption, etc.) to determine physical limits of the processor.

The HPM architecture of various embodiments, provides a means to scale power management so that a single p-unit instance does not need to be aware of the entire processor. This enables power management at a smaller granularity and improves response times and effectiveness. Hierarchical structure maintains a monolithic view to the user. For example, at an operating system (OS) level, HPM architecture gives the OS a single PMU view even though the PMU is physically distributed in one or more supervisor-supervisee configurations.

In embodiments, the HPM architecture is centralized where one supervisor controls all supervisees. In some embodiments, the HPM architecture is decentralized, wherein various p-units in various dies control overall power management by peer-to-peer communication. In some embodiments, the HPM architecture is distributed where there are different supervisors for different domains. One example of a distributed architecture is a tree-like architecture.

In some embodiments, device 5500 comprises Power Management Integrated Circuit (PMIC) 5512, e.g., to implement various power management operations for device 5500. In some embodiments, PMIC 5512 is a Reconfigurable Power Management ICs (RPMICs) and/or an IMVP (Intel® Mobile Voltage Positioning). In an example, the PMIC is within an IC die separate from processor 5504. The may implement various power management operations for device 5500. PMIC 5512 may include hardware interfaces, hardware circuitries, connectors, registers, etc., as well as software components (e.g., drivers, protocol stacks), to implement various power management operations for device 5500.

In an example, device 5500 comprises one or both PCU 5510 or PMIC 5512. In an example, any one of PCU 5510 or PMIC 5512 may be absent in device 5500, and hence, these components are illustrated using dotted lines.

Various power management operations of device 5500 may be performed by PCU 5510, by PMIC 5512, or by a combination of PCU 5510 and PMIC 5512. For example, PCU 5510 and/or PMIC 5512 may select a power state (e.g., P-state) for various components of device 5500. For example, PCU 5510 and/or PMIC 5512 may select a power state (e.g., in accordance with the ACPI (Advanced Configuration and Power Interface) specification) for various components of device 5500. Merely as an example, PCU 5510 and/or PMIC 5512 may cause various components of the device 5500 to transition to a sleep state, to an active state, to an appropriate C state (e.g., C0 state, or another appropriate C state, in accordance with the ACPI specification), etc. In an example, PCU 5510 and/or PMIC 5512 may control a voltage output by VR 5514 and/or a frequency of a clock signal output by the clock generator, e.g., by outputting the VID signal and/or the FID signal, respectively. In an example, PCU 5510 and/or PMIC 5512 may control battery power usage, charging of battery 5518, and features related to power saving operation.

The clock generator 5516 can comprise a phase locked loop (PLL), frequency locked loop (FLL), or any suitable clock source. In some embodiments, each core of processor 5504 has its own clock source. As such, each core can operate at a frequency independent of the frequency of operation of the other core. In some embodiments, PCU 5510 and/or PMIC 5512 performs adaptive or dynamic frequency scaling or adjustment. For example, clock frequency of a processor core can be increased if the core is not operating at its maximum power consumption threshold or limit. In some embodiments, PCU 5510 and/or PMIC 5512 determines the operating condition of each core of a processor, and opportunistically adjusts frequency and/or power supply voltage of that core without the core clocking source (e.g., PLL of that core) losing lock when the PCU 5510 and/or PMIC 5512 determines that the core is operating below a target performance level. For example, if a core is drawing current from a power supply rail less than a total current allocated for that core or processor 5504, then PCU 5510 and/or PMIC 5512 can temporality increase the power draw for that core or processor 5504 (e.g., by increasing clock frequency and/or power supply voltage level) so that the core or processor 5504 can perform at higher performance level. As such, voltage and/or frequency can be increased temporality for processor 5504 without violating product reliability.

In an example, PCU 5510 and/or PMIC 5512 may perform power management operations, e.g., based at least in part on receiving measurements from power measurement circuitries 5542, temperature measurement circuitries 5540, charge level of battery 5518, and/or any other appropriate information that may be used for power management. To that end, PMIC 5512 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 5510 and/or PMIC 5512 in at least one embodiment to allow PCU 5510 and/or PMIC 5512 to manage processor core energy at least in part based on value(s) detected by one or more of the sensors.

Also illustrated is an example software stack of device 5500 (although not all elements of the software stack are illustrated). Merely as an example, processors 5504 may execute application programs 5550, Operating System 5552, one or more Power Management (PM) specific application programs (e.g., generically referred to as PM applications 5558), and/or the like. PM applications 5558 may also be executed by the PCU 5510 and/or PMIC 5512. OS 5552 may also include one or more PM applications 5556*a*, 5556*b*, 5556*c*. The OS 5552 may also include various drivers 5554*a*, 5554*b*, 5554*c*, etc., some of which may be specific for power management purposes. In some embodiments, device 5500 may further comprise a Basic Input/output System (BIOS) 5520. BIOS 5520 may communicate with OS 5552 (e.g., via one or more drivers 5554), communicate with processors 5504, etc.

For example, one or more of PM applications 5558, 5556, drivers 5554, BIOS 5520, etc. may be used to implement power management specific tasks, e.g., to control voltage and/or frequency of various components of device 5500, to control wake-up state, sleep state, and/or any other appropriate power state of various components of device 5500, control battery power usage, charging of the battery 5518, features related to power saving operation, etc.

In some embodiments, battery 5518 is a Li-metal battery with a pressure chamber to allow uniform pressure on a battery. The pressure chamber is supported by metal plates (such as pressure equalization plate) used to give uniform pressure to the battery. The pressure chamber may include pressured gas, elastic material, spring plate, etc. The outer skin of the pressure chamber is free to bow, restrained at its edges by (metal) skin, but still exerts a uniform pressure on the plate that is compressing the battery cell. The pressure chamber gives uniform pressure to battery, which is used to enable high-energy density battery with, for example, 20% more battery life.

In some embodiments, pCode executing on PCU 5510*a/b* has a capability to enable extra compute and telemetries resources for the runtime support of the pCode. Here pCode refers to a firmware executed by PCU 5510*a/b* to manage performance of the 5501. For example, pCode may set frequencies and appropriate voltages for the processor. Part of the pCode are accessible via OS 5552. In various embodiments, mechanisms and methods are provided that dynamically change an Energy Performance Preference (EPP) value based on workloads, user behavior, and/or system conditions. There may be a well-defined interface between OS 5552 and the pCode. The interface may allow or facilitate the software configuration of several parameters and/or may provide hints to the pCode. As an example, an EPP parameter may inform a pCode algorithm as to whether performance or battery life is more important.

This support may be done as well by the OS 5552 by including machine-learning support as part of OS 5552 and either tuning the EPP value that the OS hints to the hardware (e.g., various components of SoC 5501) by machine-learning prediction, or by delivering the machine-learning prediction to the pCode in a manner similar to that done by a Dynamic Tuning Technology (DTT) driver. In this model, OS 5552 may have visibility to the same set of telemetries as are available to a DTT. As a result of a DTT machine-learning hint setting, pCode may tune its internal algorithms to achieve optimal power and performance results following the machine-learning prediction of activation type. The pCode as example may increase the responsibility for the processor utilization change to enable fast response for user activity, or may increase the bias for energy saving either by reducing the responsibility for the processor utilization or by saving more power and increasing the performance lost by tuning the energy saving optimization. This approach may facilitate saving more battery life in case the types of activities enabled lose some performance level over what the system can enable. The pCode may include an algorithm for dynamic EPP that may take the two inputs, one from OS 5552 and the other from software such as DTT, and may selectively choose to provide higher performance and/or responsiveness. As part of this method, the pCode may enable in the DTT an option to tune its reaction for the DTT for different types of activity.

In some embodiments, pCode improves the performance of the SoC in battery mode. In some embodiments, pCode allows drastically higher SoC peak power limit levels (and thus higher Turbo performance) in battery mode. In some embodiments, pCode implements power throttling and is part of Intel's Dynamic Tuning Technology (DTT). In various embodiments, the peak power limit is referred to PL4. However, the embodiments are applicable to other peak power limits. In some embodiments, pCode sets the Vth threshold voltage (the voltage level at which the platform will throttle the SoC) in such a way as to prevent the system from unexpected shutdown (or black screening). In some embodiments, pCode calculates the Psoc,pk SoC Peak Power Limit (e.g., PL4), according to the threshold voltage (Vth). These are two dependent parameters, if one is set, the other can be calculated. pCode is used to optimally set one parameter (Vth) based on the system parameters, and the history of the operation. In some embodiments, pCode provides a scheme to dynamically calculate the throttling level (Psoc,th) based on the available battery power (which changes slowly) and set the SoC throttling peak power (Psoc,th). In some embodiments, pCode decides the frequencies and voltages based on Psoc,th. In this case, throttling events have less negative effect on the SoC performance Various embodiments provide a scheme which allows maximum performance (Pmax) framework to operate.

In some embodiments, VR 5514 includes a current sensor to sense and/or measure current through a high-side switch of VR 5514. In some embodiments the current sensor uses an amplifier with capacitively coupled inputs in feedback to sense the input offset of the amplifier, which can be compensated for during measurement. In some embodiments, the amplifier with capacitively coupled inputs in feedback is used to operate the amplifier in a region where the input common-mode specifications are relaxed, so that the feedback loop gain and/or bandwidth is higher. In some embodiments, the amplifier with capacitively coupled inputs in feedback is used to operate the sensor from the converter input voltage by employing high-PSRR (power supply rejection ratio) regulators to create a local, clean supply voltage, causing less disruption to the power grid in the switch area. In some embodiments, a variant of the design can be used to sample the difference between the input voltage and the controller supply, and recreate that between the drain voltages of the power and replica switches. This allows the sensor to not be exposed to the power supply voltage. In some embodiments, the amplifier with capacitively coupled inputs in feedback is used to compensate for power delivery network related (PDN-related) changes in the input voltage during current sensing.

In some embodiments, VR 5514 includes LDO regulator that comprises a dual loop regulation mechanism. A first loop of the dual loop is an analog loop that compares the voltage on the output supply node with a reference, and generates a bias or voltage control to control a strength of the final power switch. The first loop regulates the output voltage relative to a reference voltage by minimizing the error between the two voltages. A second loop of the dual loop is a digital loop that controls a current source which injects current on the gate of the final power switch to boost current for a load. The second loop is an auxiliary loop. In some embodiments, the auxiliary loop boost the current load for a set interval till the tracking BW of the LDO resolves the error in the output, thereby reducing the peak-to-peak noise. In some embodiments, the quiescent current is not increased a lot by the second loop since the second loop circuit is on for a fraction of the entire LDO operation. In some embodiments, to combat data pattern dependency, a voltage comparator is used to control the current injector to prevent the output voltage going in the opposite direction.

Some embodiments use three components to adjust the peak power of SoC 5501 based on the states of a USB TYPE-C device 5529. These components include OS Peak Power Manager (part of OS 5552), USB TYPE-C Connector Manager (part of OS 5552), and USB TYPE-C Protocol Device Driver (e.g., one of drivers 5554*a*, 5554*b*, 5554*c*). In some embodiments, the USB TYPE-C Connector Manager sends a synchronous request to the OS Peak Power Manager when a USB TYPE-C power sink device is attached or detached from SoC 5501, and the USB TYPE-C Protocol Device Driver sends a synchronous request to the Peak Power Manager when the power sink transitions device state. In some embodiments, the Peak Power Manager takes power budget from the CPU when the USB TYPE-C connector is attached to a power sink and is active (e.g., high power device state). In some embodiments, the Peak Power Manager gives back the power budget to the CPU for performance when the USB TYPE-C connector is either detached or the attached and power sink device is idle (lowest device state).

In some embodiments, logic is provided to dynamically pick the best operating processing core for BIOS power-up flows and sleep exit flows (e.g., S3, S4, and/or S5). The selection of the bootstrap processor (BSP) is moved to an early power-up time instead of a fixed hardware selection at any time. For maximum boot performance, the logic selects the fastest capable core as the BSP at an early power-up time. In addition, for maximum power saving, the logic selects the most power efficient core as the BSP. Processor or switching for selecting the BSP happens during the boot-up as well as power-up flows (e.g., S3, S4, and/or S5 flows).

In some embodiments, the memories herein are organized in multi-level memory architecture and their performance is governed by a decentralized scheme. The decentralized scheme includes p-unit 5510 and memory controllers. In some embodiments, the scheme dynamically balances a number of parameters such as power, thermals, cost, latency and performance for memory levels that are progressively further away from the processor in the platform 5500 based on how applications are using memory levels that are further away from processor cores. In some examples, the decision making for the state of the far memory (FM) is decentralized. For example, a processor power management unit (p-unit), near memory controller (NMC), and/or far memory host controller (FMHC) makes decisions about the power and/or performance state of the FM at their respective levels. These decisions are coordinated to provide the most optimum power and/or performance state of the FM for a given time. The power and/or performance state of the memories adaptively change to changing workloads and other parameters even when the processor(s) is in a particular power state.

In some embodiments, an apparatus is provided that executes a power-up scheme for system 5500. In some embodiment, the apparatus applies a biometric sensor (e.g., a fingerprint sensor, eye sensor, etc.) to authenticate a user before enabling power-up of computing system 5500 or to resume transition to a power state (e.g., one of the power states defined by the Advance Configuration and Power Interface (ACPI)). Output of the biometric sensor is compared against data of a registered user for a match. The data may include an original copy of an output of the biometric sensor saved in a non-volatile memory (e.g., serial peripheral interface (SPI) flash device). If a match exists, a logic in the computing system will allow the computing system to power-up. In the absence of a match, the computing system will not be powered up. In some examples, battery charging of battery 5518 is also disabled if the match is not found.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "analog signal" is any continuous signal for which the time varying feature (variable) of the signal is a representation of some other time varying quantity, i.e., analogous to another time varying signal.

The term "digital signal" is a physical signal that is a representation of a sequence of discrete values (a quantified discrete-time signal), for example of an arbitrary bit stream, or of a digitized (sampled and analog-to-digital converted) analog signal.

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process. The examples can be combined in any combinations. For example, example 4 can be combined with example 2.

Example 1: An apparatus comprising: a first loop having a first bandwidth to regulate a voltage on an output power supply node via a transistor, wherein the transistor has a gate which is biased according to a difference between the voltage and a reference voltage; and a second loop having a second bandwidth to dynamically inject current into the gate of the transistor to cause the transistor to increase current to the output power supply node, wherein the first bandwidth is slower than the second bandwidth.

Example 2: The apparatus of example 1, wherein the first loop includes a first comparator to compare the voltage on the output power supply node with the reference voltage.

Example 3: The apparatus of example 2, wherein the second loop includes a second comparator to compare the voltage on the output power supply node with a droop threshold.

Example 4: The apparatus of example 3, wherein the droop threshold is adjustable dynamically.

Example 5: The apparatus of example 3 comprises a multiplexer to selectively provide the droop threshold from a plurality of thresholds.

Example 6: The apparatus of example 3, wherein the second comparator comprises a strong-arm-latch.

Example 7: The apparatus of example 3 comprising a counter to count up or down in accordance with a logic value of an output of the second comparator.

Example 8: The apparatus of example 7 comprising a current injector to inject current according to an output of the counter.

Example 9: The apparatus of example 8, wherein the current injector includes a plurality of current sources that are binary weighted.

Example 10: The apparatus of example 8, wherein the current injector includes a plurality of current sources that are thermometer weighted.

Example 11: The apparatus of example 9, wherein the current injector includes a plurality of switches controllable by the output of the counter, wherein an individual switch of the plurality of switches is coupled to an individual current source of the plurality of current sources.

Example 12: The apparatus of example 1, wherein the first bandwidth is about 300 MHz, and wherein the second bandwidth is about 2 GHz.

Example 13: The apparatus of example 1, wherein the second loop dynamically injects current according to a data pattern of a load.

Example 14: The apparatus of example 13, wherein the load is an IO driver coupled to a pad.

Example 15: An apparatus comprising: an analog circuitry to regulate a voltage on an output power supply node via a transistor, wherein the transistor has a gate which is biased according to a difference between the voltage and a reference voltage; and a digital circuitry to dynamically inject current into the gate of the transistor to cause the transistor to increase current to the output power supply node.

Example 16: The apparatus of example 15, wherein the analog circuitry has a first bandwidth, wherein the digital circuitry has a second bandwidth, and wherein the second bandwidth is faster than the first bandwidth.

Example 17: The apparatus of example 15, the analog circuitry includes a first comparator to compare the voltage on the output power supply node with the reference voltage, wherein the digital circuitry includes: a second comparator to compare the voltage on the output power supply node with a droop threshold; a counter to count up or down in accordance with a logic value of an output of the second comparator; a current injector to inject current according to an output of the counter, wherein the current injector includes a plurality of current sources that are binary weighted or thermometer weighted, wherein the current injector includes a plurality of switches controllable by the output of the counter, wherein an individual switch of the plurality of switches is coupled to an individual current source of the plurality of current sources.

Example 18: A system comprising: a memory; a processor coupled to the memory; a wireless interface to allow the processor to communicate with another device, wherein the processor includes a voltage regulator which comprises: an analog circuitry to regulate a voltage on an output power supply node via a transistor, wherein the transistor has a gate which is biased according to a difference between the voltage and a reference voltage; and a digital circuitry to dynamically inject current into the gate of the transistor to cause the transistor to increase current to the output power supply node.

Example 19: The system of example 18, wherein the analog circuitry has a first bandwidth, wherein the digital circuitry has a second bandwidth, and wherein the second bandwidth is faster than the first bandwidth.

Example 20: The system of example 18, the analog circuitry includes a first comparator to compare the voltage on the output power supply node with the reference voltage, wherein the digital circuitry includes: a second comparator to compare the voltage on the output power supply node with a droop threshold; a counter to count up or down in accordance with a logic value of an output of the second comparator; a current injector to inject current according to an output of the counter, wherein the current injector includes a plurality of current sources that are binary weighted or thermometer weighted, wherein the current injector includes a plurality of switches controllable by the output of the counter, wherein an individual switch of the plurality of switches is coupled to an individual current source of the plurality of current sources.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus comprising:
   a first loop having a first bandwidth to regulate a voltage on an output power supply node via a transistor, wherein the transistor has a gate which is biased according to a difference between the voltage and a reference voltage; and
   a second loop having a second bandwidth and a digitally controllable current injection circuit to dynamically inject current into the gate of the transistor to cause the transistor to increase current to the output power supply node, wherein the first bandwidth is slower than the second bandwidth.

2. The apparatus of claim 1, wherein the first loop includes a first comparator to compare the voltage on the output power supply node with the reference voltage.

3. The apparatus of claim 2, wherein the second loop includes a second comparator to compare the voltage on the output power supply node with a droop threshold.

4. The apparatus of claim 3, wherein the droop threshold is adjustable dynamically.

5. The apparatus of claim 3 comprises a multiplexer to selectively provide the droop threshold from a plurality of thresholds.

6. The apparatus of claim 3, wherein the second comparator comprises a strong-arm-latch.

7. The apparatus of claim 3 comprising a counter to count up or down in accordance with a logic value of an output of the second comparator.

8. The apparatus of claim 7 wherein the digitally controllable current injector is to inject current according to an output of the counter.

9. The apparatus of claim 8, wherein the current injector includes a plurality of current sources that are binary weighted.

10. The apparatus of claim 9, wherein the current injector includes a plurality of switches controllable by the output of the counter, wherein an individual switch of the plurality of switches is coupled to an individual current source of the plurality of current sources.

11. The apparatus of claim 8, wherein the current injector includes a plurality of current sources that are thermometer weighted.

12. The apparatus of claim 1, wherein the first bandwidth is about 300 MHz, and wherein the second bandwidth is about 2 GHz.

13. The apparatus of claim 1, wherein the second loop dynamically injects current according to a data pattern of a load.

14. The apparatus of claim 13, wherein the load is an IO driver coupled to a pad.

15. An apparatus comprising:
- a first loop having an analog circuitry to regulate a voltage on an output power supply node via a transistor, wherein the transistor has a gate which is biased according to a difference between the voltage and a reference voltage; and
- a second loop having a digital circuitry to dynamically inject current into the gate of the transistor to cause the transistor to increase current to the output power supply node.

16. The apparatus of claim 15, wherein the analog circuitry has a first bandwidth, wherein the digital circuitry has a second bandwidth, and wherein the second bandwidth is faster than the first bandwidth.

17. The apparatus of claim 15, the analog circuitry includes a first comparator to compare the voltage on the output power supply node with the reference voltage, wherein the digital circuitry includes:
- a second comparator to compare the voltage on the output power supply node with a droop threshold;
- a counter to count up or down in accordance with a logic value of an output of the second comparator;
- a current injector to inject current according to an output of the counter, wherein the current injector includes a plurality of current sources that are binary weighted or thermometer weighted, wherein the current injector includes a plurality of switches controllable by the output of the counter, wherein an individual switch of the plurality of switches is coupled to an individual current source of the plurality of current sources.

18. A system comprising:
- a memory;
- a processor coupled to the memory;
- a wireless interface to allow the processor to communicate with another device, wherein the processor includes a voltage regulator which comprises:
- a first loop having an analog circuitry to regulate a voltage on an output power supply node via a transistor, wherein the transistor has a gate which is biased according to a difference between the voltage and a reference voltage; and
- a second loop having a digital circuitry to dynamically inject current into the gate of the transistor to cause the transistor to increase current to the output power supply node.

19. The system of claim 18, wherein the analog circuitry has a first bandwidth, wherein the digital circuitry has a second bandwidth, and wherein the second bandwidth is faster than the first bandwidth.

20. The system of claim 18, the analog circuitry includes a first comparator to compare the voltage on the output power supply node with the reference voltage, wherein the digital circuitry includes:
- a second comparator to compare the voltage on the output power supply node with a droop threshold;
- a counter to count up or down in accordance with a logic value of an output of the second comparator; and
- a current injector to inject current according to an output of the counter, wherein the current injector includes a plurality of current sources that are binary weighted or thermometer weighted, wherein the current injector includes a plurality of switches controllable by the output of the counter, wherein an individual switch of the plurality of switches is coupled to an individual current source of the plurality of current sources.

* * * * *